(12) United States Patent
Nguyen et al.

(10) Patent No.: US 7,673,686 B2
(45) Date of Patent: Mar. 9, 2010

(54) METHOD OF STABILIZING UNCONSOLIDATED FORMATION FOR SAND CONTROL

(75) Inventors: Philip D. Nguyen, Duncan, OK (US); Richard D. Rickman, Duncan, OK (US); Ronald G. Dusterhoft, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 69 days.

(21) Appl. No.: 11/352,133

(22) Filed: Feb. 10, 2006

(65) Prior Publication Data

US 2006/0219405 A1 Oct. 5, 2006

Related U.S. Application Data

(63) Continuation-in-part of application No. 11/092,210, filed on Mar. 29, 2005, now Pat. No. 7,448,451.

(51) Int. Cl.
*E21B 33/138* (2006.01)
*E21B 43/26* (2006.01)
*E21B 43/27* (2006.01)

(52) U.S. Cl. .............. 166/281; 166/276; 166/280.1; 166/295; 166/307; 507/219; 507/220; 507/261; 507/266; 507/268; 523/131

(58) Field of Classification Search ............ 166/276, 166/278, 280.1, 281, 295, 300, 307; 507/219, 507/220, 261, 266, 268; 523/131
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Scheider | 260/78.3 |
| 2,869,642 A | 1/1959 | McKay et al. | |
| 3,047,067 A | 7/1962 | Williams et al. | 166/33 |
| 3,052,298 A | 9/1962 | Malott | |

(Continued)

FOREIGN PATENT DOCUMENTS

CA 2063877 5/2003

(Continued)

OTHER PUBLICATIONS

Search Report and Written Opinion of Interantional Application No. PCT/GB2006/004852 filed on Dec. 21, 2006 and Mailed on Mar. 7, 2007.

(Continued)

*Primary Examiner*—George Suchfield
(74) *Attorney, Agent, or Firm*—Robert A. Kent; Baker Botts LLP

(57) ABSTRACT

The invention provides a method for treating a subterranean formation penetrated by a wellbore. The method comprises the steps of: (a) introducing a composition through the wellbore into the subterranean formation, wherein the composition comprises: (i) a solvent consisting essentially of an aqueous dissolvable solvent comprising any solvent that is at least 25% by weight soluble in water, wherein the solvent is from about 90% to about 99.9% by weight of the composition; and (ii) a curable resin, wherein the curable resin is from about 0.01% to about 10% by weight of the composition; wherein the curable resin and the solvent are mutually selected such that, for the ratio of the curable resin to the solvent, the curable resin is soluble in the solvent; and (b) installing a mechanical sand control device into the wellbore either before or after introducing the composition into the wellbore.

17 Claims, 5 Drawing Sheets

U.S. PATENT DOCUMENTS

| | | | |
|---|---|---|---|
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | 166/33 |
| 3,329,204 A | 7/1967 | Brieger | |
| 3,336,980 A | 8/1967 | Rike | |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismukes | |
| 3,709,298 A | 1/1973 | Pramann | |
| 3,709,641 A | 1/1973 | Sarem | |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al | 166/307 |
| 3,842,911 A | 10/1974 | Know et al. | 166/307 |
| 3,850,247 A | 11/1974 | Tinsley | |
| 3,854,533 A | 12/1974 | Gurley et al. | 166/276 |
| 3,857,444 A | 12/1974 | Copeland | 166/276 |
| 3,861,467 A | 1/1975 | Harnsberger | |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,933,205 A | 1/1976 | Kiel | |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,085,802 A | 4/1978 | Sifferman et al. | |
| 4,089,437 A | 5/1978 | Chutter et al. | |
| 4,127,173 A | 11/1978 | Watkins et al. | |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |

| Patent No. | Date | Inventor | Class |
|---|---|---|---|
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar et al. | |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutta et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,244,362 A | 9/1993 | Conally et al. | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrigues | 166/295 |
| 5,341,880 A | 8/1994 | Thorstensen et al. | 166/278 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,403,822 A | 4/1995 | Mueller et al. | |
| 5,420,174 A | 5/1995 | Dewprashad | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/212.9 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Facteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |

| Patent | Date | Inventor | Class |
|---|---|---|---|
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,944,106 A | 8/1999 | Dalrymple et al. | |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,784 A | 10/1999 | Ryan | |
| 5,960,877 A | 10/1999 | Funkhouser et al. | |
| 5,960,878 A | 10/1999 | Nguyen et al. | |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,063,738 A | 5/2000 | Chatterji et al. | |
| 6,068,055 A | 5/2000 | Chatterji et al. | 166/293 |
| 6,069,117 A | 5/2000 | Onan et al. | 507/202 |
| 6,070,667 A | 6/2000 | Gano | |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacob et al. | 424/489 |
| 6,124,246 A | 9/2000 | Heathman et al. | 507/219 |
| 6,130,286 A | 10/2000 | Thomas et al. | 524/507 |
| 6,131,661 A | 10/2000 | Conner et al. | |
| 6,135,987 A | 10/2000 | Tsai et al. | 604/365 |
| 6,140,446 A | 10/2000 | Fujiki et al. | 528/15 |
| 6,143,698 A | 11/2000 | Murphey et al. | |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,165,947 A | 12/2000 | Chang et al. | |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keeffe et al. | 525/438 |
| 6,186,228 B1 | 2/2001 | Wegener et al. | |
| 6,187,834 B1 | 2/2001 | Thayer et al. | 522/15 |
| 6,187,839 B1 | 2/2001 | Eoff et al. | |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,310,008 B1 | 10/2001 | Rietjens | |
| 6,311,773 B1 | 11/2001 | Todd et al. | 166/280 |
| 6,315,040 B1 | 11/2001 | Donnelly | |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,342,467 B1 | 1/2002 | Chang et al. | |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,394,181 B2 | 5/2002 | Schnatzmeyer et al. | |
| 6,401,817 B1 | 6/2002 | Griffith et al. | 166/295 |
| 6,405,796 B1 | 6/2002 | Meyer et al. | |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,415,509 B1 | 7/2002 | Echols et al. | |
| 6,422,183 B1 | 7/2002 | Kato | |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,457,518 B1 | 10/2002 | Castano-Mears et al. | |
| 6,458,885 B1 | 10/2002 | Stengal et al. | 524/507 |
| 6,478,092 B2 | 11/2002 | Voll et al. | |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,510,896 B2 | 1/2003 | Bode et al. | |
| 6,520,255 B2 | 2/2003 | Tolman et al. | |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,534,449 B1 | 3/2003 | Gilmour et al. | |
| 6,536,939 B1 | 3/2003 | Blue | |
| 6,538,576 B1 | 3/2003 | Schultz et al. | 340/859.6 |
| 6,543,545 B1 | 4/2003 | Chatterji et al. | 166/381 |
| 6,550,959 B2 | 4/2003 | Huber et al. | |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |

| Patent | Date | Inventor | Class |
|---|---|---|---|
| 6,569,814 B1 | 5/2003 | Brady et al. | 507/201 |
| 6,582,819 B2 | 6/2003 | McDaniel et al. | 428/402 |
| 6,588,926 B2 | 7/2003 | Huber et al. | |
| 6,588,928 B2 | 7/2003 | Huber et al. | |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,609,578 B2 | 8/2003 | Patel et al. | |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | 507/202 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,677,426 B2 | 1/2004 | Noro et al. | |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneko et al. | 428/323 |
| 6,725,926 B2 | 4/2004 | Nguyen et al. | 166/254.1 |
| 6,725,930 B2 | 4/2004 | Boney et al. | |
| 6,725,931 B2 | 4/2004 | Nguyen et al. | 166/280.2 |
| 6,729,404 B2 | 5/2004 | Nguyen et al. | 166/280.2 |
| 6,729,405 B2 | 5/2004 | DiLullo et al. | |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,235 B1 | 8/2004 | England | |
| 6,776,236 B1 | 8/2004 | Nguyen | 166/279 |
| 6,832,650 B2 | 12/2004 | Nguyen et al. | 166/279 |
| 6,832,655 B2 | 12/2004 | Ravensbergen et al. | |
| 6,837,309 B2 | 1/2005 | Boney et al. | |
| 6,851,474 B2 | 2/2005 | Nguyen | 166/279 |
| 6,866,099 B2 | 3/2005 | Nguyen | |
| 6,881,709 B2 | 4/2005 | Nelson et al. | |
| 6,887,834 B2 | 5/2005 | Nguyen et al. | 507/221 |
| 6,962,200 B2 | 11/2005 | Nguyen et al. | |
| 6,978,836 B2 | 12/2005 | Nguyen et al. | |
| 6,997,259 B2 | 2/2006 | Nguyen | |
| 7,013,976 B2 | 3/2006 | Nguyen et al. | |
| 7,017,665 B2 | 3/2006 | Nguyen | |
| 7,025,134 B2 | 4/2006 | Byrd et al. | |
| 7,028,774 B2 | 4/2006 | Nguyen et al. | |
| 7,032,667 B2 | 4/2006 | Nguyen et al. | |
| 7,036,589 B2 | 5/2006 | Nguyen | |
| 7,040,403 B2 | 5/2006 | Nguyen et al. | |
| 7,059,406 B2 | 6/2006 | Nguyen | |
| 7,063,150 B2 | 6/2006 | Slabaugh et al. | |
| 7,066,258 B2 | 6/2006 | Justus et al. | |
| 7,073,581 B2 | 7/2006 | Nguyen et al. | |
| 7,080,688 B2 | 7/2006 | Todd et al. | |
| 7,081,439 B2 | 7/2006 | Sullivan et al. | |
| 7,093,658 B2 | 8/2006 | Chatterji et al. | |
| 7,104,325 B2 | 9/2006 | Nguyen et al. | |
| 7,114,560 B2 | 10/2006 | Nguyen et al. | |
| 7,114,570 B2 | 10/2006 | Nguyen et al. | |
| 7,117,942 B2 | 10/2006 | Dalrymple et al. | |
| 7,131,491 B2 | 11/2006 | Blauch et al. | |
| 7,153,575 B2 | 12/2006 | Anderson et al. | |
| 7,156,194 B2 | 1/2007 | Nguyen | |
| 7,178,596 B2 | 2/2007 | Blauch et al. | |
| 7,204,311 B2 | 4/2007 | Welton et al. | |
| 7,210,528 B1 | 5/2007 | Brannon et al. | |
| 7,216,711 B2 | 5/2007 | Nguyen et al. | |
| 7,252,146 B2 | 8/2007 | Slabaugh et al. | |
| 7,261,156 B2 | 8/2007 | Nguyen et al. | |
| 7,264,051 B2 | 9/2007 | Nguyen et al. | |
| 7,264,052 B2 | 9/2007 | Nguyen et al. | |
| 7,267,717 B2 | 9/2007 | Watanabe et al. | |
| 7,273,099 B2 | 9/2007 | East, Jr. et al. | |
| 7,281,581 B2 | 10/2007 | Nguyen et al. | |
| 7,306,037 B2 | 12/2007 | Nguyen et al. | |
| 7,343,973 B2 | 3/2008 | Dusterhoft et al. | |
| 2001/0016562 A1 | 8/2001 | Muir et al. | 507/201 |
| 2002/0036088 A1 | 3/2002 | Todd | |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2002/0104217 A1 | 8/2002 | Echols et al. | |
| 2002/0160920 A1 | 10/2002 | Dawson et al. | |
| 2002/0169085 A1 | 11/2002 | Miller et al. | |
| 2002/0189808 A1 | 12/2002 | Nguyen et al. | |
| 2003/0006036 A1 | 1/2003 | Malone et al. | 166/250.12 |
| 2003/0013871 A1 | 1/2003 | Mallon et al. | |
| 2003/0060374 A1 | 3/2003 | Cooke, Jr. | 507/200 |
| 2003/0106690 A1 | 6/2003 | Boney et al. | |
| 2003/0114314 A1 | 6/2003 | Ballard et al. | 507/100 |
| 2003/0114317 A1 | 6/2003 | Benton et al. | |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lunghofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0230431 A1 | 12/2003 | Reddy et al. | |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040712 A1 | 3/2004 | Ravi et al. | |
| 2004/0040713 A1 | 3/2004 | Nguyen et al. | 166/295 |
| 2004/0043906 A1 | 3/2004 | Heath et al. | |
| 2004/0045712 A1 | 3/2004 | Eoff et al. | |
| 2004/0048752 A1 | 3/2004 | Nguyen et al. | 507/269 |
| 2004/0055747 A1 | 3/2004 | Lee | 166/278 |
| 2004/0060702 A1 | 4/2004 | Kotlar et al. | |
| 2004/0106525 A1 | 6/2004 | Willberg et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0152602 A1 | 8/2004 | Boles | |
| 2004/0177961 A1 | 9/2004 | Nguyen | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256097 A1 | 12/2004 | Byrd et al. | |
| 2004/0256099 A1 | 12/2004 | Nguyen et al. | 166/249 |
| 2004/0261993 A1 | 12/2004 | Nguyen | |
| 2004/0261995 A1 | 12/2004 | Nguyen et al. | 166/279 |
| 2004/0261997 A1 | 12/2004 | Nguyen et al. | 166/281 |
| 2004/0261999 A1 | 12/2004 | Nguyen | |
| 2005/0000694 A1 | 1/2005 | Dalrymple et al. | |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | |
| 2005/0006096 A1 | 1/2005 | Nguyen et al. | 166/295 |
| 2005/0028976 A1 | 2/2005 | Nguyen | |

| | | | |
|---|---|---|---|
| 2005/0028979 A1 | 2/2005 | Brannon et al. | |
| 2005/0034862 A1 | 2/2005 | Nguyen .................. 166/281 | |
| 2005/0034865 A1 | 2/2005 | Todd et al. | |
| 2005/0045326 A1 | 3/2005 | Nguyen | |
| 2005/0045330 A1 | 3/2005 | Nguyen et al. | |
| 2005/0045384 A1 | 3/2005 | Nguyen | |
| 2005/0051331 A1 | 3/2005 | Nguyen et al. .......... 166/280.2 | |
| 2005/0059555 A1 | 3/2005 | Dusterhoft et al. | |
| 2005/0061509 A1 | 3/2005 | Nguyen | |
| 2005/0092489 A1 | 5/2005 | Welton et al. | |
| 2005/0126780 A1 | 6/2005 | Todd et al. | |
| 2005/0139359 A1 | 6/2005 | Maurer et al. | |
| 2005/0145385 A1 | 7/2005 | Nguyen | |
| 2005/0173116 A1 | 8/2005 | Nguyen et al. | |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194140 A1 | 9/2005 | Dalrymple et al. | |
| 2005/0194142 A1 | 9/2005 | Nguyen | |
| 2005/0197258 A1 | 9/2005 | Nguyen | |
| 2005/0207001 A1 | 9/2005 | Laufer et al. | |
| 2005/0257929 A1 | 11/2005 | Nguyen et al. | |
| 2005/0263283 A1 | 12/2005 | Nguyen | |
| 2005/0267001 A1 | 12/2005 | Weaver et al. | |
| 2005/0269086 A1* | 12/2005 | Nguyen et al. .............. 166/281 | |
| 2005/0269101 A1 | 12/2005 | Stegent et al. | |
| 2005/0274510 A1 | 12/2005 | Nguyen et al. | |
| 2005/0274517 A1 | 12/2005 | Blauch et al. | |
| 2005/0274520 A1 | 12/2005 | Nguyen et al. | |
| 2005/0277554 A1 | 12/2005 | Blauch et al. | |
| 2005/0284632 A1 | 12/2005 | Dalrymple et al. | |
| 2005/0284637 A1 | 12/2005 | Stegent et al. | |
| 2006/0048943 A1 | 3/2006 | Parker et al. | |
| 2006/0048944 A1 | 3/2006 | van Batenburg et al. | |
| 2006/0052251 A1 | 3/2006 | Anderson et al. | |
| 2006/0089266 A1 | 4/2006 | Dusterhoft et al. | |
| 2006/0113078 A1 | 6/2006 | Nguyen et al. | |
| 2006/0124303 A1 | 6/2006 | Nguyen et al. | |
| 2006/0124309 A1 | 6/2006 | Nguyen et al. | |
| 2006/0157243 A1 | 7/2006 | Nguyen | |
| 2006/0175058 A1 | 8/2006 | Nguyen | |
| 2006/0219408 A1 | 10/2006 | Nguyen et al. | |
| 2006/0240995 A1 | 10/2006 | Rickman et al. | |
| 2006/0260810 A1 | 11/2006 | Weaver et al. | |
| 2006/0260813 A1 | 11/2006 | Welton et al. | |
| 2006/0264332 A1 | 11/2006 | Welton et al. | |
| 2007/0007010 A1 | 1/2007 | Welton et al. | |
| 2007/0012445 A1 | 1/2007 | Nguyen et al. | |
| 2007/0114032 A1 | 5/2007 | Stegent et al. | |
| 2007/0131422 A1 | 6/2007 | Gatlin et al. | |
| 2007/0131425 A1 | 6/2007 | Gatlin et al. | |

FOREIGN PATENT DOCUMENTS

| | | | |
|---|---|---|---|
| EP | 0313243 | B1 | 10/1988 |
| EP | 0528595 | A1 | 8/1992 |
| EP | 0506934 | | 10/1992 |
| EP | 0510762 | A2 | 11/1992 |
| EP | 0643196 | A2 | 6/1994 |
| EP | 0834644 | A2 | 4/1998 |
| EP | 0853186 | A2 | 7/1998 |
| EP | 0864726 | A2 | 9/1998 |
| EP | 0879935 | B1 | 11/1998 |
| EP | 0933498 | A1 | 8/1999 |
| EP | 1001133 | A1 | 5/2000 |
| EP | 1132569 | A2 | 9/2001 |
| EP | 1326003 | A1 | 7/2003 |
| EP | 1362978 | A1 | 11/2003 |
| EP | 1394355 | A1 | 3/2004 |
| EP | 1396606 | A2 | 3/2004 |
| EP | 1398460 | | 3/2004 |
| EP | 1398460 | A1 | 3/2004 |
| EP | 1403466 | A2 | 3/2004 |
| EP | 1464789 | A1 | 10/2004 |
| EP | 1607572 | | 12/2005 |
| GB | 1107584 | | 3/1968 |
| GB | 1264180 | | 12/1969 |
| GB | 1292718 | | 10/1972 |
| GB | 2298440 | | 9/1996 |
| GB | 2382143 | A | 4/2001 |
| WO | WO 93/15127 | | 8/1993 |
| WO | WO 94/07949 | | 4/1994 |
| WO | WO 94/08078 | | 4/1994 |
| WO | WO 94/08090 | | 4/1994 |
| WO | WO 95/09879 | | 4/1995 |
| WO | WO 97/11845 | | 4/1997 |
| WO | WO 99/27229 | | 6/1999 |
| WO | WO 01/81914 | | 11/2001 |
| WO | WO 01/87797 | A1 | 11/2001 |
| WO | WO 02/12674 | A1 | 2/2002 |
| WO | WO 03/027431 | A1 | 4/2003 |
| WO | WO 03/027431 | A2 | 4/2003 |
| WO | WO 2004/009956 | | 1/2004 |
| WO | WO 2004/037946 | A1 | 5/2004 |
| WO | WO 2004/038176 | A1 | 5/2004 |
| WO | WO 2004/083600 | | 9/2004 |
| WO | WO2004090281 | | 10/2004 |
| WO | WO2004104368 | | 12/2004 |
| WO | WO 2005/021928 | A2 | 3/2005 |
| WO | WO2005080749 | | 9/2005 |
| WO | WO 2006103385 | | 10/2006 |
| WO | WO 2007091007 | | 8/2007 |

OTHER PUBLICATIONS

U.S. Appl. No. 10/383,154, filed Mar. 6, 2003, Nguyen, et al.
U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.
U.S. Appl. No. 10/649,029, filed Aug. 27, 2003, Nguyen, et al.
U.S. Appl. No. 10/650,063, filed Aug. 26, 2003, Nguyen.
U.S. Appl. No. 10/650,064, filed Aug. 26, 2003, Nguyen, et al.
U.S. Appl. No. 10/650,065, filed Aug. 26, 2003, Nguyen.
U.S. Appl. No. 10/659,574, filed Sep. 10, 2003, Nguyen, et al.
U.S. Appl. No. 10/727,365, filed Dec. 4, 2003, Reddy, et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent, et al.
U.S. Appl. No. 10/861,829, filed Jun. 4, 2004, Stegent, et al.
U.S. Appl. No. 10/862,986, filed Jun. 8, 2004, Nguyen, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/868,593, filed Jun. 15, 2004, Nguyen, et al.
U.S. Appl. No. 10/868,608, filed Jun. 15, 2004, Nguyen, et al.
U.S. Appl. No. 10/937,076, filed Sep. 9, 2004, Nguyen, et al.
U.S. Appl. No. 10/944,973, filed Sep. 20, 2004, Nguyen, et al.
U.S. Appl. No. 10/972,648, filed Oct. 25, 2004, Dusterhoft, et al.
U.S. Appl. No. 10/977,673, filed Oct. 29, 2004, Nguyen.
U.S. Appl. No. 11/009,277, filed Dec. 8, 2004, Welton, et al.
U.S. Appl. No. 11/011,394, filed Dec. 12, 2004, Nguyen, et al.
U.S. Appl. No. 11/035,833, filed Jan. 14, 2005, Nguyen.
U.S. Appl. No. 11/049,252, filed Feb. 2, 2005, Van Batenburg, et al.
U.S. Appl. No. 11/053,280, filed Feb. 8, 2005, Nguyen.
U.S. Appl. No. 11/056,635, filed Feb. 11, 2005, Dusterhoft, et al.
Halliburton, *CoalStim<sup>SM</sup> Service, Helps Boost Cash Flow From CBM Assets*, Stimulation, HO3679 Oct. 3, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems: Provides Up to Three Times the Conductivity of RCPs.*, Stimulation, HO3296 May 4, 2004, Halliburton Communications.

Halliburton "*CobraFrac^SM Service, Coiled Tubing Fracturing—Cost-Effective Method for Stimulating Untapped Reserves*", 2 pages, 2004.

Halliburton Cobra Frac Advertisement, 2001.

Halliburton "*SurgiFrac^SM Service, A Quick and cost-Effective Method to Help Boost Production From Openhole Horizonal Completions*", 2002.

Halliburton, SandWedge® NT Conductivity Enhancement System, Enhances Proppant Pack Conductivity and Helps Prevent Intrusion of Formation Material for Improved Long-Term Production, Stimulation, HO2289 May 4, 2004, Halliburton Communications.

Almond et al., Factors Affecting Proppant Flowback With Resin Coated Proppants, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "Pressure Pulsing Waterflooding in Dual Porosity Naturally Fractured Reservoirs" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "Degradable Aliphatic Polyesters" edited by A.-C. Alberston, pp. 1-138, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch.12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available@ www.cdxgas.com/solution.html, printed pp. 1-2.

Halliburton brochure entitled "H2Zero™ Service Introducing The Next Generation of cost-Effective Conformance Control Solutions", 2002.

Halliburton brochure entitled"" INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

AI-Anazi, et al., "Laboratory Measurements of Condensate Blocking and Treatment for Both Low and High Permeability Rocks," SPE paper 77546, 2002.

AI-Anazi, et al., "A Successful Methanol Treatment in a Gas-Condensate Reservoir: Field Application," SPE 80901, 2003.

Office Action from U.S. Appl. No. 11/092,210, filed Jan. 17, 2008.

Office Action from U.S. Appl. No. 11/092,210, filed Jul. 2, 2007.

Office Action from U.S. Appl. No. 11/092,210, filed Feb. 14, 2007.

Foreign Search Report, Mar. 7, 2007.

CDX Gas, "What is Coalbed Methane?" CDX, LLC Available@ www.cdxgas.com/what.html printed p. 1, Feb. 16, 2005.

Notice of Allowance dated May 12, 2008 from U.S. Appl. No. 11/092,210.

U.S. Appl. No. 12/080,647, filed Apr. 4,2008, Dalrymple et al.

"Santrol Bioballs"; http://www.fairmounminerals.com/.sub.—SANTROL/SANTROL%20Web%20Site/B.sub-.—TD.htm. cited by other.

International Search Report and Opinion (PCT/GB2004/002412), Sep. 16, 2004.

International Search Report and Opinion (PCT/GB2005/003845), Jul. 31, 2006.

International Search Report and Opinion (PCT/GB2005/004009), Jan. 11, 2006.

International Search Report (CPW 21582 EP), Mar. 11, 2005.

International Search Report and Opinion (PCT/GB2004/001497), Jul. 20, 2004.

International Search Report and Opinion (PCT/GB2004/001842), Dec. 10, 2004.

International Search Report and Opinion (PCT/GB2004/002674), Dec. 16, 2004.

International Search Report and Opinion (PCT/GB2004/002968), Nov. 16, 2004.

International Search Report and Opinion (PCT/GB2004/004242), Feb. 10, 2005.

International Search Report and Opinion (PCT/GB2004-000689), Jun. 4, 2004.

International Search Report and Opinion (PCT/GB2004/002727), Mar. 11, 2005.

International Search Report and Opinion (PCT/GB2004/002747), Mar. 11, 2005.

International Search Report and Opinion (PCT/GB2005/004010), Feb. 21, 2006.

International Search Report and Opinion (PCT/GB2006/004102), Feb. 20, 2007.

International Search Report and Opinion (PCT/GB2006/004137), Jun. 5, 2008.

International Search Report and Opinion (PCT/GB2007/000467), Jun. 15, 2007.

International Search Report and Opinion (PCT/GB2006/000366), Jun. 22, 2006.

International Search Report and Opinion (PCT/GB2005/003747), Dec. 12, 2005.

International Search Report and Opinion (PCT/GB2007/000421), May 10, 2007.

International Search Report and Opinion (PCT/GB2007/002273), Sep. 3, 2007.

International Search Report and Opinion (PCT/GB2004/002948), May 24, 2005.

International Search Report and Opinion (PCT/GB2005/000637), Jun. 2, 2005.

International Search Report and Opinion (PCT/GB2005/000634), Jun. 8, 2005.

International Preliminary Report on Patentability (PCT/GB2005/000634), Sep. 14, 2006.

Paccaloni, et al., "Key Factors for Enhanced Results of Matrix Stimulation," SPE 17154, Feb. 1988.

Paccaloni, et al., "Advances in Matrix Stimulation Technology," SPE 20623, Mar. 1993.

Nguyen, et al., "Controlling Proppant Flowback in High-Temperature, High-Production Wells," SPE 82215, May 2003.

Dusterhoft, et al., "Maximizing Effective Proppant Permeability under High-Stress, High Gas-Rate Conditions," SPE 90398, Sep. 2004.

Halliburton Technical flier, Multi-Stage Free Completion Methods, 2 pages, 1999.

Halliburton "CobraJetFracSM Service, Cost-Effective Technology That Can Help Reduce Cost per BOE Produced, Shorten Cycle Time and Reduce Capex", Apr. 2003.

Chelating Agents, Encyclopedia of Chemical Technology, vol. 5 (764-795), 2001.

Halliburton brochure entitled "Pillar Frac Stimulation Technique" Fracturing Services Technical Data Sheet, 2 pages, Jun. 1999.

Albertson et al., "Aliphatic Polyesters: Synthesis, Properties and Applications", Advance in Polymer Science, vol. 157 Degradable Aliphatic Polyesters, 2002.

* cited by examiner

Pressure Drop (psi) vs. Time (s)

METHOD OF STABILIZING UNCONSOLIDATED FORMATION FOR SAND CONTROL

CROSS-REFERENCE TO RELATED APPLICATIONS

This is a continuation-in-part of application entitled "METHODS FOR CONTROLLING MIGRATION OF PARTICULATES IN A SUBTERRANEAN FORMATION," Ser. No. 11/092,210, filed Mar. 29, 2005 now U.S. Pat. No. 7,448,451.

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The invention generally relates to compositions and methods for treating a subterranean formation. More specifically, the invention relates to compositions and methods for use in treating a subterranean formation for controlling the migration of particulates, such as formation sand and fines.

BACKGROUND

Hydrocarbon is obtained from a subterranean formation by drilling a wellbore that penetrates the hydrocarbon-bearing formation. It is desirable to maximize both the rate of flow and the overall amount of flow of hydrocarbon from the subterranean formation to the surface.

The rate of hydrocarbon flow and the overall amount of hydrocarbon flow declines when the bottom hole flowing pressure falls below the dew point. When this occurs, a liquid aqueous phase accumulates near the well. This condensate accumulation, sometimes called condensate blocking, reduces the hydrocarbon relative permeability and thus the well's hydrocarbon productivity. In addition, the presence of aqueous liquids such as this condensate will cause the water swellable clays present in the formation to swell, which further reduces the formation's permeability. The productivity loss associated with condensate buildup can be substantial. In some cases, well productivities can decline by a factor of 2 to 4 as a result of condensate accumulation.

The rate of hydrocarbon flow and the overall amount of hydrocarbon flow can be impacted when well treatment fluids such as fracturing fluids, gravel pack fluids, and aqueous acidizing fluids are injected into the formation. Well treatment fluids sometimes decrease hydrocarbon's relative permeability through the formation compared to other fluids in the reservoir because of the limited reservoir pressure and capillary forces tightly holding the treatment fluids in the pore spaces previously occupied by hydrocarbon. The pockets of treatment fluid, which are interlocked with hydrocarbon, are hard to remove from the formation without some kind of stimulation treatment.

Another way that the rate of hydrocarbon flow and the overall amount of hydrocarbon flow can be reduced is by fines production or sand migration in the formation or by precipitation. The high velocity in the porous medium near the wellbore is sometimes sufficient to mobilize fines that can then plug channels in the formation. More often, formation sand and fines often become unstable and migrate as a result of water movement through the formation. Fines are most likely to move when the water phase is mobile because most formation fines are water-wet. The presence of a mobile water phase can cause fines migration and subsequent formation damage. It is desirable to minimize fines migration, since fines block flow paths, choking the potential production of the well, as well as causing damage to downhole and surface equipment, such as screens, pumps, flow lines, storage facilities, etc.

Hydrocarbon wells are often located in subterranean zones that contain unconsolidated particulates that may migrate within the subterranean formation with the oil, gas, water, and/or other fluids produced by the wells. Unconsolidated subterranean zones include those that contain loose particulates and those wherein the bonded particulates have insufficient bond strength to withstand the forces produced by the production of fluids through the zones.

Support devices such as screens and slotted liners are often used to provide support for these unconsolidated formations to inhibit formation collapse. In some instances, the annulus around the support device is gravel packed to reduce presence of voids between the device and the wellbore wall. Typically, such so-called "gravel packing operations" involve the pumping and placement of a quantity of a desired particulate into the unconsolidated formation in an area adjacent to a well bore. Gravel packing forms a filtration bed near the well bore that acts as a physical barrier to the transport of unconsolidated formation fines with the production of hydrocarbons. These support devices provide support for the wellbore and gravel packing and prevent some fines from entering the hydrocarbon flow into the well.

Some types of screens are adapted to be expanded to contact the wellbore wall either with or without gravel packing. It is however, impossible to eliminate all voids between the screen and the wellbore wall. Fines fill these voids blocking flow and in some instances fines flowing through these voids erode the screen destroying its effectiveness.

One common type of gravel packing operation involves placing a gravel pack screen in the well bore and packing the surrounding annulus between the screen and the well bore with gravel of a specific mesh size designed to prevent the passage of formation sand. The gravel pack screen is generally a filter assembly used to retain the gravel placed during gravel pack operation. A wide range of sizes and screen configurations are available to suit the characteristics of the gravel pack sand. Similarly, a wide range of gravel sizes is available to suit the characteristics of the unconsolidated or poorly consolidated particulates in the subterranean formation. The resulting structure presents a barrier to migrating sand from the formation while still permitting fluid flow.

Gravel packs may be time consuming and expensive to install. Due to the time and expense needed it is sometimes desirable to place a screen without the gravel and, particularly in cases in which an expandable screen is being placed, it may be unrealistic to place a bed of gravel between the expandable screen and the well bore. Even in circumstances in which it is practical to place a screen without a gravel pack, it is often difficult to determine an appropriate screen size to use as formation sands tend to have a wide distribution of sand grain sizes. When small quantities of sand are allowed to flow through a screen, screen erosion becomes a significant concern. As a result, the placement of gravel as well as the screen is often necessary to control the formation sands.

An expandable screen is often installed to maintain the diameter of the wellbore for ease of access at a later time by eliminating installation of conventional screens, gravel placement, and other equipment. However, the ability to provide universal screen mesh that can handle wide particle size distribution of formation sand is unrealistic, if not impossible.

Another method used to control particulates in unconsolidated formations involves consolidating a subterranean producing zone into hard, permeable masses. Consolidation of a subterranean formation zone often involves applying a resin followed by a spacer fluid and then a catalyst. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging the pore channels, halting pumping when the well bore is plugged with solid material, or resulting in a downhole explosion as a result of the heat of polymerization. Also, these conventional processes are not practical to treat long intervals of unconsolidated regions due to the difficulty in determining whether the entire interval has been successfully treated with both the resin and the external catalyst.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

While these unconsolidated formation treatment methods provide improved fines control, multiple treatment steps that are time consuming and expensive are required. Therefore, it is desirable to develop a relatively simple and relatively inexpensive treatment method and composition to improve or maintain the rate of hydrocarbon flow by reducing fines migration.

SUMMARY OF THE INVENTION

The invention provides a method for treating a subterranean formation penetrated by a wellbore. The method comprises the steps of: (a) introducing a composition through the wellbore into the subterranean formation, wherein the composition comprises: (i) a solvent consisting essentially of an aqueous dissolvable solvent comprising any solvent that is at least 25% by weight soluble in water, wherein the solvent is from about 90% to about 99.9% by weight of the composition; and (ii) a curable resin, wherein the curable resin is from about 0.01% to about 10% by weight of the composition; wherein the curable resin and the solvent are mutually selected such that, for the ratio of the curable resin to the solvent, the curable resin is soluble in the solvent; and (b) installing a mechanical sand control device into the wellbore either before or after introducing the composition into the wellbore.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION

The present invention provides improved methods for completing an unconsolidated or poorly consolidated subterranean formation penetrated by a wellbore.

The methods can be performed in vertical, inclined, or horizontal wellbores, and in "open-hole" and/or under-reamed completions as well as in cased wells. If the method is to be carried out in a cased wellbore, the casing is perforated to provide for fluid communication with a zone of interest in the subterranean formation.

The term "vertical wellbore" is used herein to mean a portion of a wellbore in a subterranean formation that is substantially vertical or deviated from vertical in an amount up to about 15°. The term "horizontal wellbore" is used herein to mean a portion of a wellbore in a subterranean formation that is substantially horizontal, or at an angle from vertical in the range of from about 75° to about 105°. The term "inclined wellbore" is used to mean a portion of a wellbore in a subterranean formation that is inclined at an angle between that of a vertical or horizontal wellbore. Since the present invention is applicable in vertical, inclined, and horizontal wellbores, the terms "upper and lower," "top and bottom," as used herein are relative terms and are intended to apply to the respective positions within a particular wellbore, while the term "levels" is meant to refer to respective spaced positions along the wellbore.

The method of the invention preferably further comprises forming an ultra-thin curable resin composition, wherein the composition comprises: a solvent and a curable resin.

The solvent preferably consists essentially of an aqueous dissolvable solvent comprising any solvent that is at least 25% by weight soluble in water. The solvent is from about 90% to about 99.9% by weight of the composition.

The curable resin is from about 0.01% to about 10% by weight of the composition. The curable resin and the solvent are mutually selected such that, for the ratio of the curable resin to the solvent, the curable resin is soluble in the solvent.

The invention can be used with any mechanical sand control device, such as a perforated liner, a slotted pipe, a wire-wrapped screen, a non-expandable screen, and an expandable screen. The invention can be used with or without gravel packing. The step of contacting the formation with ultra-thin resin can be performed either before or after the sand screen installation and/or gravel packing are completed. It is beneficial to provide a method that transforms small formation sand or fines into large aggregates without impeding their permeability while enhancing their retention efficiency behind the screen without plugging or eroding it.

Figure 1:
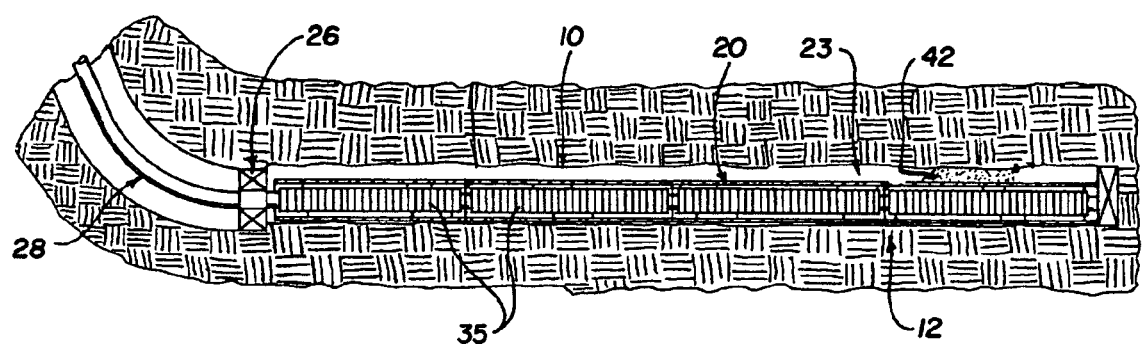
FIG. 1 is a schematic, cross-sectional view of an exemplary configuration operating environment in which the inventions of the present invention are used depicting a screened and gravel packed portion of the wellbore extending into an unconsolidated subterranean hydrocarbon formation.

The invention also includes the step of introducing the composition through the wellbore into the subterranean formation. By introducing the ultra-thin curable resin compound into the subterranean formation, migration of particulates from the formation are inhibited from moving through the sand screen and into the wellbore. Preferably, the method further includes the step of isolating a zone of interest. More preferably, after isolating a zone of interest, the method further includes the step of introducing a fluid into the wellbore at a pressure sufficient to create at least one fracture in the subterranean formation. Still further, the method most preferably includes producing hydrocarbon by flowing hydrocarbon through the treated subterranean formation, through the mechanical sand control device, and into the wellbore Referring to the drawings, FIG. 1 illustrates a horizontal open-hole wellbore 10. The wellbore 10 extends into an unconsolidated subterranean formation or zone 12 from a cased wellbore extending to the surface. While wellbore 10 is illustrated as a horizontal open-hole completion, it should be recognized that the present invention is also applicable to vertical or inclined wellbores, and to cased wellbores; e.g., as illustrated in U.S. Pat. No. 5,341,880, which is incorporated herein by reference in its entirety for all purposes.

A sand screen 20 is located inside wellbore 10. Sand screen 20 has a "cross-over" sub connected to its upper end, which is suspended from the surface on a tubing or work string (not shown). A packer 26 is attached to the crossover. The crossover and packer 26 are conventional gravel pack forming tools and are well known to those skilled in the art. The packer 26 is used to permit crossover during packing and to isolate a portion of the wellbore. The crossover provides channels for the circulation of gravel slurry to form a grave pack 42 (shown partially formed) in the annulus on the outside of the screen 20 and returns circulation of fluid through the screen 20 and up the washpipe 28. The washpipe 28 is attached to the gravel pack service tool and is run inside the screen 20. The washpipe 28 is used to force fluid to flow around the bottom section of the screen 20.

Sand screen 20 may be of a single length or it may be comprised of a plurality of screen units 35 which are connected together with threaded couplings or the like (not shown). As shown, each of the screen units 35 is basically identical to each other and each is comprised of a perforated base pipe having a continuous length of wrap wire wound thereon, which forms a "screen section" therein. The base pipe can have a plurality of perforations therein, or other types of permeable base pipes, e.g., slotted pipe, etc., can be used without departing from the present invention.

The term "sand control device" is used generically herein and is meant to include and cover all types of similar structures which are commonly used in gravel pack well completions which permit flow of fluids through the "screen" while blocking the flow of particulates (e.g., commercially-available screens; slotted or perforated liners or pipes; sintered-metal screens; sintered-sized, mesh screens; screened pipes; pre-packed screens, radially-expandable screens and/or liners; or combinations thereof).

One embodiment of the present invention describes a method of controlling particulates flow through a well screen positioned in a subterranean formation comprising placing a pre-flush fluid into a portion of a subterranean formation, and then placing a low-viscosity solution of a curable resin into the portion of a subterranean formation.

The methods of the present invention can employ but do not require an after-flush fluid and yet do not suffer reduced permeability to the portion of the subterranean formation. It has been discovered that by placing a relatively small amount of curable resin diluted in a carefully selected aqueous dissolvable solvent, a thin layer of the curable resin is formed on the surface of the formation sand and fines particulates, as the solvent is drawn into the formation water or pre-flush water. The capillary pressure existing between formation particulates pulls the curable resin solution remaining in the pore spaces so that the treatment of ultra-thin curable resin composition does not result in permeability reduction of the treated formations.

Without being limited by any theoretical explanation, it is believed that the composition of the invention advantageously increases hydrocarbon flow rate and overall amount of hydrocarbon flow as a combined result of: (a) miscible displacement of water by the solvent to reduce or prevent water buildup (water "block") which chokes off the flow path of hydrocarbon; (b) stabilization of the formation fines by the curable resin; (c) "wetting" the surface of the formation with the curable resin that serves to repel water with its hydrophobicity; and (d) prevention of formation fines from swelling. It is believed that displacing water from the formation and introducing the curable resin provide synergistic benefits to increase hydrocarbon production. It is believed that as a result of these factors, the permeability of aqueous fluids is increased through the composition-treated formation, which allows the water to be expelled out of the formation matrix near the wellbore or fracture faces surrounding the proppant pack.

It has been found that the solvent for use in the invention increases the relative permeability of hydrocarbon compared to other aqueous fluids in the formation by reducing water condensate and water blocking in the subterranean formation. The solvent is effective in removing both condensate and water to restore gas productivity in both low and high permeability formations. The solvent removes both water and condensate by a multi-contact miscible displacement. Further explanation of this theory is found in SPE 77546, entitled "Laboratory Measurements of Condensate Blocking and Treatment for Both Low and High Permeability Rocks", and SPE 80901, entitled "A Successful Methanol Treatment in a Gas-Condensate Reservoir: Field Application".

Also, the invention serves to stabilize the formation fines by consolidating the fines in the formation, thereby preventing the fines from migrating, which consequently results in blocking hydrocarbon flow paths. In particular, the fines are stabilized by the curable resin, thereby preventing fines from plugging the pores of the formation, especially after acidizing treatments. Further, the fines are prevented from being produced, disrupting the production schedule and damaging downhole and surface equipment.

The ultra-thin curable resin advantageously forms a thin film coat on the clay particulates, thereby encapsulating the clay particulates and preventing the clay particulates from swelling and choking off the permeability.

Furthermore, the curable resin of the composition is capable of coating the surfaces of the formation sands or particulates, the surface of propped fractures or natural fractures, and/or the surface of proppants, thus "wetting" the surface with the curable resin. Wettability describes how a fluid adheres to a surface. Wettability plays a major role in defining how hydrocarbon and water coexist in pores of a formation and, therefore, influence numerous properties such as relative permeability of fluids. When more than one fluid is present in a permeable system, the flow of each is affected by the amount and distribution of the other(s). In uniformly wetted formations, the relative permeability to one fluid increases as the system becomes more wetted by the other fluid.

More particularly, the curable resin forms an oil-wet surface on the formation. Oil wetting the surface of the rock will have a tendency to lower the irreducible water saturation and have an impact on the relative permeability to both water and hydrocarbon. Lowering the irreducible water saturation should increase the effective permeability to water as well as the effective permeability to hydrocarbon. With an increase of permeability of aqueous fluids through the formation, the production of the aqueous fluids is facilitated. It is desired to increase the permeability of aqueous fluids through the formation because the presence of aqueous fluid, whether from natural brines, a result of condensation, or injected as a treatment, acts as a barrier to hydrocarbon migration from the formation into the wellbore. The aqueous-based treatment fluids can saturate the pore spaces of the treated region, preventing the migration of hydrocarbon into and through the same pore spaces. In an analogous manner, if the well is to be produced without first stimulating, naturally occurring aqueous fluids in the formation in the flow path or potential flow path may hinder hydrocarbon production.

It is believed that the curable resin binds to the surface of the formation, particulates, or proppants, at least partially coating the surface, thereby increasing its hydrophobicity. In this way, the coating of the curable resin formed on the surface is able to remain on the surface over an extended period of time, providing long-term benefits. Thus, minor, if any, amount of curable resin is produced from the formation.

The methods of the present invention are able to place a curable resin without an after-flush and regain permeability of at least about 70%. The term "regain permeability" refers to the percentage of permeability of a portion of a subterranean formation following treatment; that is, it is a percentage of the post-treatment permeability as compared to the pre-treatment permeability.

In some embodiments of the present invention, the regain permeability is at least about 75%. In other embodiments of the present invention, the regain permeability is at least about 80%. In still other embodiments of the present invention the regain permeability is at least about 85%. In still other embodiments of the present invention, the regain permeability is at least about 90%.

By eliminating the need for an after-flush step, the methods of the present invention become more economical to perform, less uncertainty of whether the after-flush fluid could enter the same resin treated area, and less likely to damage the formation being treated.

The methods of the present invention are capable of substantially stabilizing the particulates such that loose or weakly consolidated particulates are prevented from shifting or migrating once the treatment is complete. This is particularly significant in the context of portions of formations where it is desirable to control the particulates without having to use a gravel pack. In such situations, the methods of the present invention including the use of a screen or liner (which may be an expandable or traditional screen or a perforated or slotted liner, or any similar device known in the art) may act to control particulates to a sufficiently high degree that a gravel pack becomes unnecessary.

Thus, according to the methods of the present invention, which include the use of both a low-viscosity curable resin composition and a screen/liner, the low-viscosity curable resin, inter alia, creates a stable, permeable region around the well bore that resists particulate migration, while the screen/liner may be used, inter alia, to provide mechanical support to prevent bore hole collapse. Such embodiments may make the use of screen-only or liner-only (no gravel pack) completions functional over a much wider range of formation properties than previously thought possible.

The methods of the present invention may be used in a wide variety of particulate control operations. For example, they can be used on a well bore having a screen or liner in place wherein the pre-flush fluid and the low-viscosity curable resin are placed in the formation by injecting them directly through the screen or liner. In addition, they can be used on a well bore having a gravel pack in place (with a screen or liner in place) wherein the pre-flush fluid and the low-viscosity curable resin are placed in the formation by injecting them directly through the gravel pack as a means to prevent damage due to formation fines migration or as a remedial treatment to cure a sand production problem. In addition, they can be used to help reduce proppant flowback from a propped fracture by placing the pre-flush fluid and the low-viscosity curable resin into the portion of the subterranean formation so as to displace and push the unconsolidated particulates (whether proppant or formations fines) into the formation or deeper into the proppant pack and holding them in place with the curable resin once the operation is complete.

Suitable pre-flush fluids comprise either a hydrocarbon liquid or a mixture of an aqueous liquid and a surfactant. The pre-flush fluid acts to prepare the formation particulates to accept the adhesive. Any pre-flush fluid compatible with the later-used curable resin and capable of facilitating the coating of the curable resin on the subterranean particles and surfaces and aiding the curable resin in flowing to the contact points between adjacent particulates in the formation may be used in the present invention. Formations suitable for treatment with the methods of the present invention are generally water wet, and by using either a hydrocarbon pre-flush fluid or an aqueous pre-flush fluid with an appropriate surfactant, the formation may be made ready to accept the placement of the adhesive.

Where a hydrocarbon pre-flush fluid is used, suitable fluids include liquid hydrocarbon fluids such as kerosene, diesel, crude oil, hydrocarbon-based solvents such as xylene, hydrocarbon-based condensates, hydrocarbon-based distillates, and combinations thereof. Generally, a desirable pre-flush has a relatively low cost and low viscosity and minimizes safety concerns, for these reasons kerosene and diesel may be preferred hydrocarbon pre-flush fluids in the methods of the present invention.

Where an aqueous pre-flush fluid is used, the aqueous liquid component may be fresh water, salt water (e.g., water containing one or more salts dissolved therein), brine, seawater, or any other aqueous liquid that does not adversely react with the other components used in accordance with this invention or with the subterranean formation. Surfactants suitable for inclusion in the aqueous pre-flush fluids include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$-$C_{22}$ alkyl phosphonate surfactant is preferred. The surfactant or surfactants used are included in the aqueous liquid in an amount sufficient to prepare the subterranean formation to receive a treatment of an curable resin by wetting the particulates in the formation so that the resin can attach to those particulates. In some embodiments of the present invention, the aqueous pre-flush fluid comprises surfactant in an amount ranging from about 0.1% to about 15% by weight of the aqueous liquid.

Selection of an appropriate curable resin is related, at least in part, to the forces that the zone will be subjected to during production. For example, in a zone that is expected to be subjected to relatively low fluid flow rates, lower drag forces on the particulate materials may mean that use of a non-aqueous tackifying agent may sufficiently control the particulates. However, at relatively high flow rates a curable resin may be better suited to provide adequate cohesion between the formation particulates.

Resins suitable for use as an curable resin in the methods of the present invention include all resins known in the art that are capable of forming a hardened, consolidated mass. Many suitable resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. An epoxy resin may be preferred when using the methods of the present invention in formations having temperatures ranging from about 65° F. to about 350° F. and a furan resin may be preferred when using the methods of the present invention in formations having temperatures above about 300° F.

It is within the ability of one skilled in the art, with the benefit of this disclosure, to select a suitable resin for use in embodiments of the present invention and to determine whether a catalyst is required to trigger curing.

In order for the curable resin used in the present invention to achieve a low enough viscosity to be suitable for use in the present invention, a solvent is required. The methods of the present invention call for the viscosity of the curable resin to be less than about 100 cP. In some embodiments the viscosity is less than about 50 cP. In other embodiments, the viscosity is less than about 10 cP, in still other embodiments the viscosity is less than about 5 cP. Such low viscosity is achieved by providing a ratio of the curable resin in the solvent to be from about 0.01:99.99 to about 10:90 by weight relative to one another. The curable resin and the solvent are mutually selected such that, for the ratio of the resin to the solvent, the resin is soluble in the solvent. The ratio of the curable resin in the solvent can also be from about 0.5:99.5 to about 5:95 by weight relative to one another. The curable resin and the solvent are mutually selected such that, for the ratio of the curable resin to the solvent, the curable resin is soluble in the solvent.

Solvents suitable for use with the adhesives used in the present invention comprise aqueous dissolvable solvents that are compatible with the chosen curable resin and that are capable of achieving the desired viscosity effect. When exposed to water within a subterranean formation, a suitable aqueous dissolvable solvent will have a higher affinity to the water than to the curable resin and, as a result, the curable resin will be deposited on formation surfaces as the water is drawn away. The solvents that can be used in the present invention preferably include those having high flash points (most preferably above about 125° F.). Examples of solvents suitable for use in the present invention include, but are not limited to, ethanol, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, furfuryl aldehyde, butyl lactate, fatty acid methyl esters, and combinations thereof.

Selection of the solvent is related to, among other things, the chosen adhesive. For example, where an epoxy resin is used an ethanol solvent may be preferred whereas when a furan resin is used an isopropyl alcohol or furfuryl aldehyde solvent may be preferred. Moreover, depending upon the desired curable resin viscosity (and the required amount of dilution with solvent), the optimum solvent may differ. For example, when using an epoxy resin in combination with a solvent, methanol may be suitable for dilutions only up to about 50% epoxy resin and 50% methanol solvent, but when a greater percentage of solvent is needed methanol may be unsuitable because at dilutions greater than about 50% the epoxy resin may not disperse properly in the methanol solvent. In contrast, ethanol may be a suitable solvent for use with an epoxy resin at dilutions as high at 90% ethanol solvent to 10% epoxy resin. It is within the ability of one skilled in the art, with the benefit of this disclosure, to select an appropriate solvent to achieve a viscosity suitable to the subterranean conditions.

The composition of the invention can be introduced ahead of, along with, or following any well treatment procedure, including but not limited to hydraulic fracturing treatments, gravel packing treatments, and acidizing treatments. The composition of the invention can also include other materials that do not adversely affect the benefits of the composition.

The method of the invention can also be used in conjunction with a preflush treatment fluid. For example, a preflush treatment fluid comprising a mixture of mutual solvent and brine or simply a brine solution can be introduced into the formation to remove oil residue prior to introducing the composition. Other preflush treatment fluids are also contemplated, such as an acidizing treatment.

Further, the composition can be used as a preflush treatment for hydraulic fracturing or a prepack treatment fluid for gravel packing operations. The composition can be used as a remedial treatment to be injected into the formation through the proppant or gravel pack of a previously performed fracturing treatment or gravel pack. The composition can also be used to coat gravel or other particulates to alter the surface wettability of the gravel, proppant, or other particulates in order to easily remove any water or condensate that is formed in the porous matrix of the gravel, proppant, or other particulates, as well as in the formation matrix located near the gravel pack, proppant pack, or acidized fractures. The composition is especially advantageous as a remediation treatment after the curable resin is used to at least partially coat proppants as described in Halliburton's U.S. Pat. No. 5,775,425 issued Jul. 7, 1998; U.S. Pat. No. 5,787,986 issued Aug. 4, 1998 by Jim D. Weaver et al.; U.S. Pat. No. 5,833,000 issued Nov. 10, 1998 by Jim D. Weaver et al.; U.S. Pat. No. 5,839,510 issued Nov. 24, 1998, by Jim D. Weaver et al.; U.S. Pat. No. 5,871,049 issued Feb. 16, 1999 by Jim D. Weaver et al.; U.S. Pat. No. 5,853,048 issued Dec. 29, 1988 by Jim D. Weaver; and U.S.

Pat. No. 6,047,772 issued Apr. 11, 2000 by Jim D. Weaver et al., and U.S. Pat. No. 6,209,643 issued Apr. 3, 2001 by Philip D. Nguyen et al. When used as a remediation treatment in such applications, an especially advantageous oil-wet surface on the proppants as well as the formation's surface is formed by the composition. The composition allows aqueous fluids to easily flow through the formation to be produced from the formation or to flow into the formation such as in aqueous well treatment fluids.

The ultra-thin resin composition is preferably introduced to the subterranean formation at a matrix flow rate. That is, the composition is added at such a rate that it is able to penetrate the formation without substantially affecting the structure of the formation sands or proppant matrixes it encounters.

To facilitate a better understanding of the present invention, the following examples of some of the preferred embodiments are given. In no way should such examples be read to limit the scope of the invention.

EXAMPLES

Example 1

Figure 2:
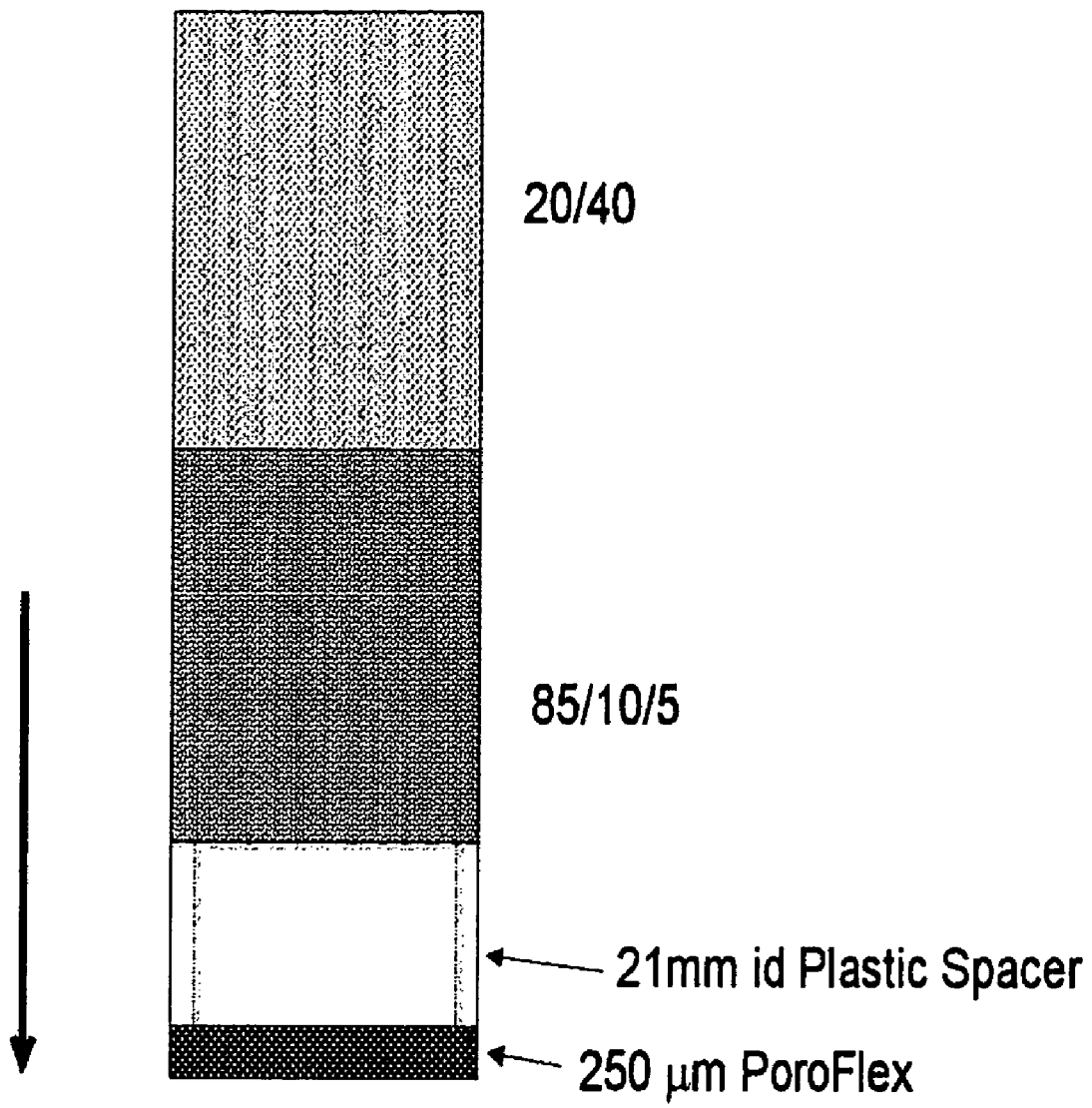
FIG. 2 is a is a schematic, cross-sectional view of a test sleeve used to simulate a screen and gravel packed portion of a wellbore extending into an unconsolidated subterranean hydrocarbon formation.

Experiments were performed with simulated unconsolidated formation and a screen to determine if the methods of the present inventions will result in increased flow through a well screen filter. Sample test sleeves were used to test simulated well conditions. The sleeves were made of transparent material. The sleeves were assembled with well screens across one end to simulate well screens installed in unconsolidated sand formations. For the purposes of these examples, the screen was formed from sections of material used in the Halliburton PoroFlex brand commercial screens. An 85/10/5 synthetic sand (85% by weight of Oklahoma No. 1 sand, 10% by weight silica flour, and 5% by weight smectite) was packed in the sleeves, followed by 20/40 mesh sand. The sands were packed into individual flow cells. In one test setup, a gap was provided behind the PoroFlex (screen piece), for example with a plastic spacer, simulating incomplete compliance of the screen with respect to the formation sand. An example of such a sand pack and filter combination is shown schematically in FIG. 2.

The synthetic sand and 20/40 sands in the sleeves were then saturated with 3% KCl brine by flowing the solution through the screen towards the simulated formation. In the examples treated with an ultra-thin curable resin, the ultra-thin curable resin comprised a diluted 2-component epoxy resin system made up with 0.5 parts of hardenable resin component, 0.5 parts of hardening agent component, and 10 parts of methanol solvent. The ultra-thin curable resin was injected in the same direction through the screen to treat the simulated formation sand. The viscosity of the diluted resin was less than about 1 cP.

The entire system was then put in an oven for curing at 150° F. for 16 hours. After that time, 3% KCl was flowed through the formation material and screen at a constant rate of 6 mL/min (in reverse direction to simulate the well producing) while the pressure necessary to maintain this flow rate was monitored. In testing of both treated and untreated formation sand packs, the flow rates were cycled on and off every 60 minutes, i.e. brine was injected through the pack for 60 minutes and then stopped for 3 minutes to simulate cycling the well.

Figure 3:
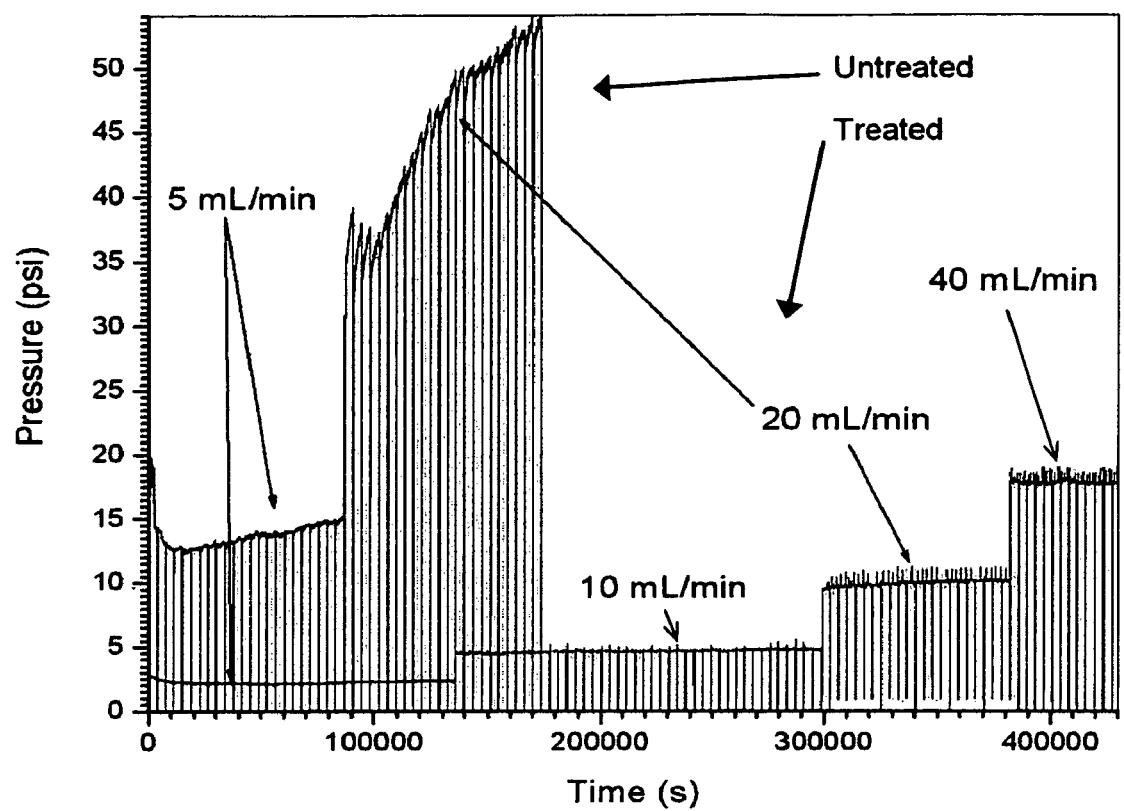
FIG. 3 is a graph of the pressure drops across the test sleeves for flow tests on untreated and treated synthetic samples of formation sand packed spaced apart from a sand control screen.

The results showed a low and steady pressure drop across the simulated formation sands throughout constant or increased flow rates without production of formation particulate. See FIG. 3, "treated" portion of graph showing pressure drop vs. time.

In contrast, flowing through formation sand without treatment of ultra-thin curable resin composition showed that unconsolidated sand can freely move as soon as the flow of brine was started. Sand particulate was observed to produce through the screen, coupled with a build up of pressure drop across the screen regardless of whether the screen mesh size was correctly selected for the formation sand. See FIG. 3, "untreated" portion of graph showing pressure drop (in pounds per square inch) vs. time (in seconds).

Example 2

Testing was repeated for both treated and untreated formation sand, except the screen piece was placed tightly against the formation sand simulating complete compliance. Similar results were obtained.

Example 3

Figure 4:
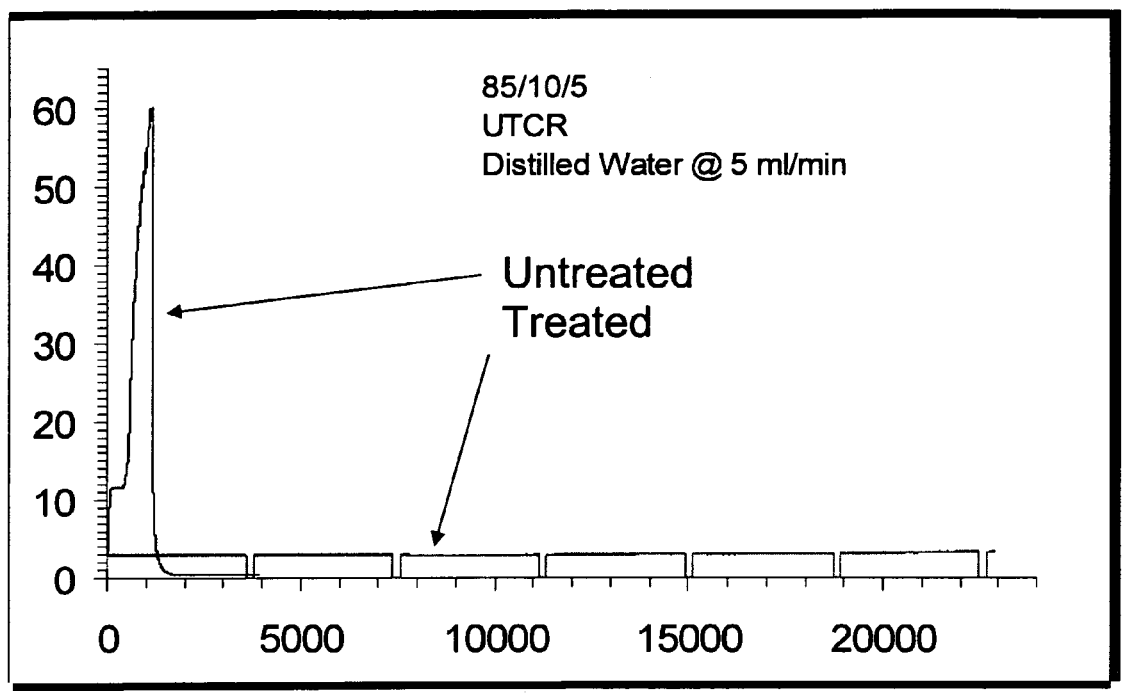
FIG. 4 is a graph of the pressure drops across the test sleeves for flow tests on untreated and treated samples of unconsolidated formation material packed against a sand control screen.

In a separate tests using the same set up as described above, fresh distilled water ("DI") water was injected through treated and untreated samples of formation sand spaced apart from the screen to represent a lack of conformity of the screen to the formation sand. FIG. 4 shows that at flow rate of 5 mL/minute, the pressure drop across the untreated formation sand increased significantly higher than pressure drop across the treated formation sand, which remained low and flat. The flow of DI water through the untreated sand pack was stopped after 15 minutes of flow time. See FIG. 4, "untreated" and "treated" graphed lines showing pressure drop (in pounds per square inch) vs. time (in seconds). This indicated that without the treatment of ultra-thin curable resin, the clay swelled and choked off the permeability. Coating of a thin film as a result of resin treatment helped encapsulate the clay particulates and prevented them from swelling.

Example 4

Figure 5:
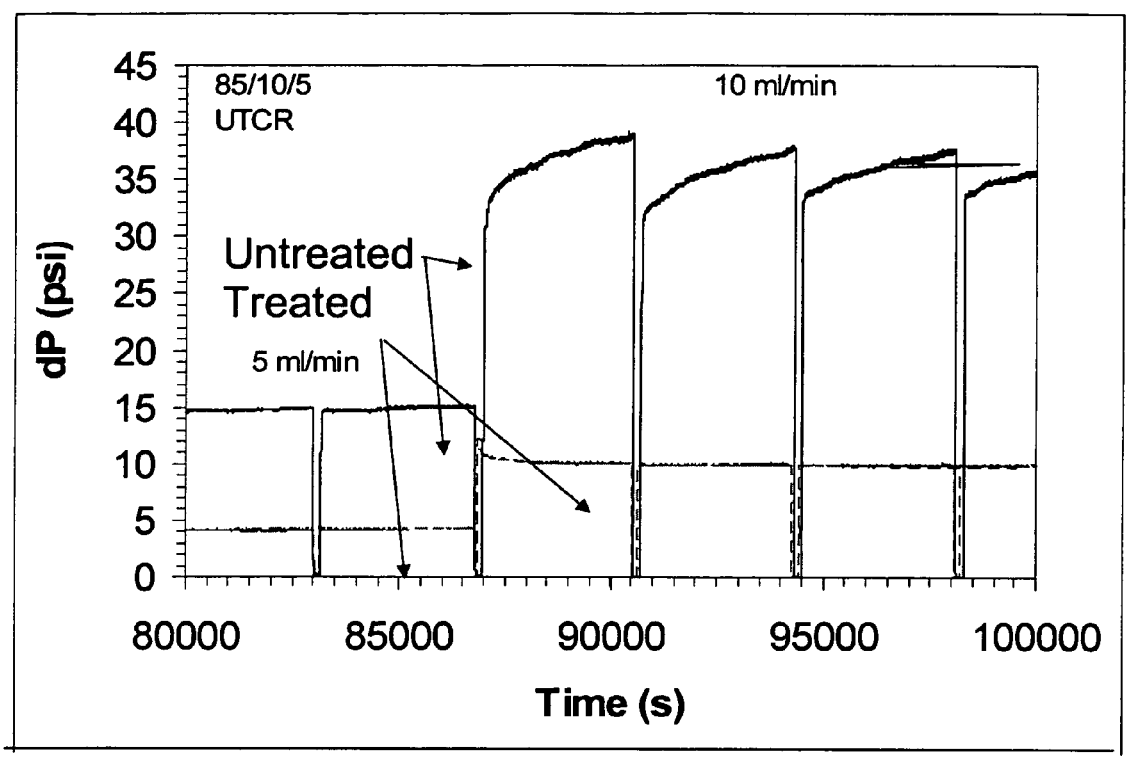
FIG. 5 is a graph of the pressure drops across the test sleeves for flow tests on untreated and treated samples of unconsolidated formation material packed against a sand control screen.

Flow tests were also performed with samples of unconsolidated formation material packed against a sand control screen. The tests showed that the untreated formation material initially caused plugging and formation damage that caused an increase in differential pressure, followed by material being produced through the screen that caused a decreasing trend in differential pressure. In real life with severe well conditions of high flow rates, this could be enough to cause catastrophic failure to the screen due to erosion. The treated formation sample showed no signs of plugging, fines migration, or solids production through the screen during the course of the test. The differential pressure for this test stayed nearly constant for the duration of the test and was significantly less than that for the non-stabilized sample at any point in the test. The results of the test showing pressure over time are shown in FIG. 5, for "untreated" and "treated" graphed lines showing pressure drop (in pounds per square inch) vs. time (in seconds).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for treating a subterranean formation penetrated by a wellbore, the method comprising the steps of:
   (a) introducing a composition through the wellbore into the subterranean formation, wherein the composition comprises:
      i. a solvent consisting essentially of an aqueous dissolvable solvent comprising any solvent that is at least 25% by weight soluble in water, wherein the solvent is from about 90% to about 99.9% by weight of the composition; and
      ii. a curable resin, wherein the curable resin is from about 0.01% to about 10% by weight of the composition;
   wherein the curable resin and the solvent are mutually selected such that, for the ratio of the curable resin to the solvent, the curable resin is soluble in the solvent; and
   (b) installing a mechanical sand control device into the wellbore either before or after introducing the composition into the wellbore.

2. The method according to claim 1, wherein the subterranean formation is unconsolidated or weakly consolidated.

3. The method according to claim 1, wherein the subterranean formation is clay laden.

4. The method according to claim 1, further comprising the step of, prior to introducing the composition: isolating a zone of interest in the subterranean.

5. The method according to claim 4, the method further comprising the step of, after isolating a zone of interest and after introducing the composition: introducing a fluid into the wellbore at a pressure sufficient to create at least one fracture in the subterranean formation.

6. The method according to claim 5, the method further comprising the step of producing hydrocarbon by flowing hydrocarbon through the treated subterranean formation, through the mechanical sand control device, and into the wellbore.

7. The method according to claim 4, the method further comprising the step of, prior to introducing the composition: injecting a preflush treatment fluid through the wellbore into the subterranean formation.

8. The method according to claim 7, wherein the preflush treatment fluid is selected from the group consisting of brine and a mutual solvent, brine, an acid, or any mixture thereof in any proportion.

9. The method according to claim 7, wherein the preflush treatment fluid is selected from the group consisting of kerosene, diesel, crude oil, a hydrocarbon-based solvent, a hydrocarbon-based condensate, or a hydrocarbon-based distillate.

10. The method according to claim 4, further comprising the step of, prior to the step of introducing the composition: introducing an acidizing composition through the wellbore into the subterranean formation.

11. The method according to claim 4, wherein the aqueous dissolvable solvent is selected from the group consisting of ethanol, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, furfuryl aldehyde, butyl lactate, fatty acid methyl esters, and any mixture thereof in any proportion.

12. The method according to claim 4, wherein the curable resin is selected from the group consisting of a two component epoxy based resin, a novolak resin, a polyepoxide resin, a phenolaldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and any mixture thereof in any proportion.

13. The method according to claim 4, wherein the composition is not overdisplaced.

14. The method according to claim 4, wherein the step of introducing the composition through the wellbore and into the subterranean formation further comprises the step of introducing a particulate through the wellbore into the subterranean formation together with the composition.

15. The method according to claim 4, further comprising the step of, after installing the mechanical sand control device: flowing back fluid through the subterranean formation into the wellbore.

16. The method according to claim 4, further comprising the step of, after installing the mechanical sand control device: producing hydrocarbon by flowing hydrocarbon through the treated subterranean formation, through the mechanical sand control device, and into the wellbore.

17. The method according to claim 1, wherein the mechanical sand control device is selected from the group consisting of: a perforated liner, a slotted pipe, a wire-wrapped screen, a non-expandable screen, and an expandable screen.

* * * * *